US012472770B2

(12) United States Patent
Han et al.

(10) Patent No.: US 12,472,770 B2
(45) Date of Patent: Nov. 18, 2025

(54) COUPLING BETWEEN A STEERABLE WHEEL AND A HOUSING IN A VEHICLE WHEEL UNIT

(71) Applicant: Joy Global Underground Mining LLC, Warrendale, PA (US)

(72) Inventors: Jianjun Han, Gracemere (AU); Nathan Weckerly, Bruin, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 789 days.

(21) Appl. No.: 17/827,103

(22) Filed: May 27, 2022

(65) Prior Publication Data

US 2023/0382160 A1 Nov. 30, 2023

(51) Int. Cl.
*B60B 27/00* (2006.01)
*B62D 7/16* (2006.01)

(52) U.S. Cl.
CPC ............ *B60B 27/0021* (2013.01); *B62D 7/16* (2013.01)

(58) Field of Classification Search
CPC ........ B60B 27/0021; B62D 7/16; B62D 7/18; B60K 17/046; B60K 17/306
See application file for complete search history.

(56) References Cited

U.S. PATENT DOCUMENTS

| | | | |
|---|---|---|---|
| 2,357,742 A | 9/1944 | Jeffrey | |
| 2,381,672 A | 8/1945 | Lee | |
| 2,858,897 A * | 11/1958 | Sibley | E21F 13/025 475/346 |
| 4,418,785 A * | 12/1983 | Ehrlinger | B60B 27/04 180/254 |
| 4,733,743 A * | 3/1988 | Weiss | B60K 17/3515 180/255 |
| 5,356,351 A * | 10/1994 | Hvolka | B60T 1/062 180/255 |

(Continued)

FOREIGN PATENT DOCUMENTS

| | | |
|---|---|---|
| CN | 203157713 U | 8/2013 |
| CN | 204956076 U | 1/2016 |

(Continued)

OTHER PUBLICATIONS

British Combined Search and Examination Report for related Application No. GB2304963.8 dated Oct. 4, 2023 (3 page).

*Primary Examiner* — S. Joseph Morano
*Assistant Examiner* — Emily G. Castonguay
(74) *Attorney, Agent, or Firm* — Husch Blackwell LLP (57) ABSTRACT

A wheel unit for a vehicle includes a main housing configured to be coupled to a chassis of the vehicle, the main housing including first and second control arms. A transmission housing includes a body having first and second protrusions extending from the body, the first protrusion partially defining a first cavity that receives a portion of the first control arm, and the second protrusion partially defining a second cavity that receives a portion of the second control arm. A first pin is coupled between the first protrusion of the transmission housing and the first control arm of the main housing. A second pin is coupled between the second protrusion of the transmission housing and the second control arm of the main housing, the first and second pins defining a steering axis. The transmission housing is pivotably coupled to the main housing about the steering axis.

19 Claims, 7 Drawing Sheets

(56) References Cited

U.S. PATENT DOCUMENTS

| | | |
|---|---|---|
| 6,761,234 B1 | 7/2004 | Lamela et al. |
| 8,220,812 B2 | 7/2012 | Sandri et al. |
| 9,643,527 B2 | 5/2017 | Uranaka et al. |
| 10,399,437 B2 | 9/2019 | Ruscak et al. |
| 2018/0065478 A1 | 3/2018 | Ruscak et al. |
| 2021/0024559 A1 | 1/2021 | Li et al. |

FOREIGN PATENT DOCUMENTS

| | | |
|---|---|---|
| CN | 111361487 A | 7/2020 |
| CN | 112218766 A | 1/2021 |
| EP | 0334691 A1 | 9/1989 |
| EP | 1574382 A2 | 9/2005 |
| JP | 2007145071 A | 6/2007 |
| WO | 2020/234882 A1 | 11/2020 |

* cited by examiner

COUPLING BETWEEN A STEERABLE WHEEL AND A HOUSING IN A VEHICLE WHEEL UNIT

FIELD OF THE DISCLOSURE

The present disclosure relates to a wheel unit, and in particular, to a bifurcated coupling between a steerable wheel and a main housing of a vehicle wheel unit.

SUMMARY

In one aspect, the disclosure provides a wheel unit for a vehicle. The wheel unit includes a main housing configured to be coupled to a chassis of the vehicle, the main housing including first and second control arms. A transmission housing includes a body having first and second protrusions extending from the body, the first protrusion partially defining a first cavity that receives a portion of the first control arm, and the second protrusion partially defining a second cavity that receives a portion of the second control arm. A first pin is coupled between the first protrusion of the transmission housing and the first control arm of the main housing. A second pin is coupled between the second protrusion of the transmission housing and the second control arm of the main housing, the first and second pins defining a steering axis. The transmission housing is pivotably coupled to the main housing about the steering axis. A transmission is at least partially received within the transmission housing. A wheel rim is rotatably coupled relative to the transmission housing about a rotational axis, the wheel rim drivable about the rotational axis by the transmission.

In another aspect, the disclosure provides a wheel unit for a vehicle. The wheel unit comprises a main housing configured to be coupled to a chassis of the vehicle. The main housing includes a control arm having a control arm aperture. A transmission housing includes a body having a protrusion extending from the body, the protrusion partially defining a receiving cavity that receives a portion of the control arm. The protrusion includes a protrusion aperture. A pin is insertable through the protrusion aperture of the transmission housing to be at least partially received within the control arm aperture of the main housing, the pin defining a steering axis, the transmission housing pivotably coupled to the main housing about the steering axis. A transmission is at least partially received within the body of the transmission housing, the transmission configured to drive a wheel rim that is rotatably coupled relative to the transmission housing about a rotational axis.

In another aspect, the disclosure provides a wheel unit for a vehicle. The wheel unit includes a transmission housing including a body having a protrusion extending from the body. The protrusion includes a first aperture, and the body includes a second aperture. A transmission is at least partially received within the body of the transmission housing, the transmission being configured to drive a wheel rim that is rotatably coupled relative to the transmission housing about a rotational axis. A pin is insertable through the first aperture of the protrusion to be at least partially received within the second aperture of the body, where the pin defines a steering axis, and the transmission housing is configured to selectively move the wheel rim about the steering axis.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, whether direct or indirect. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
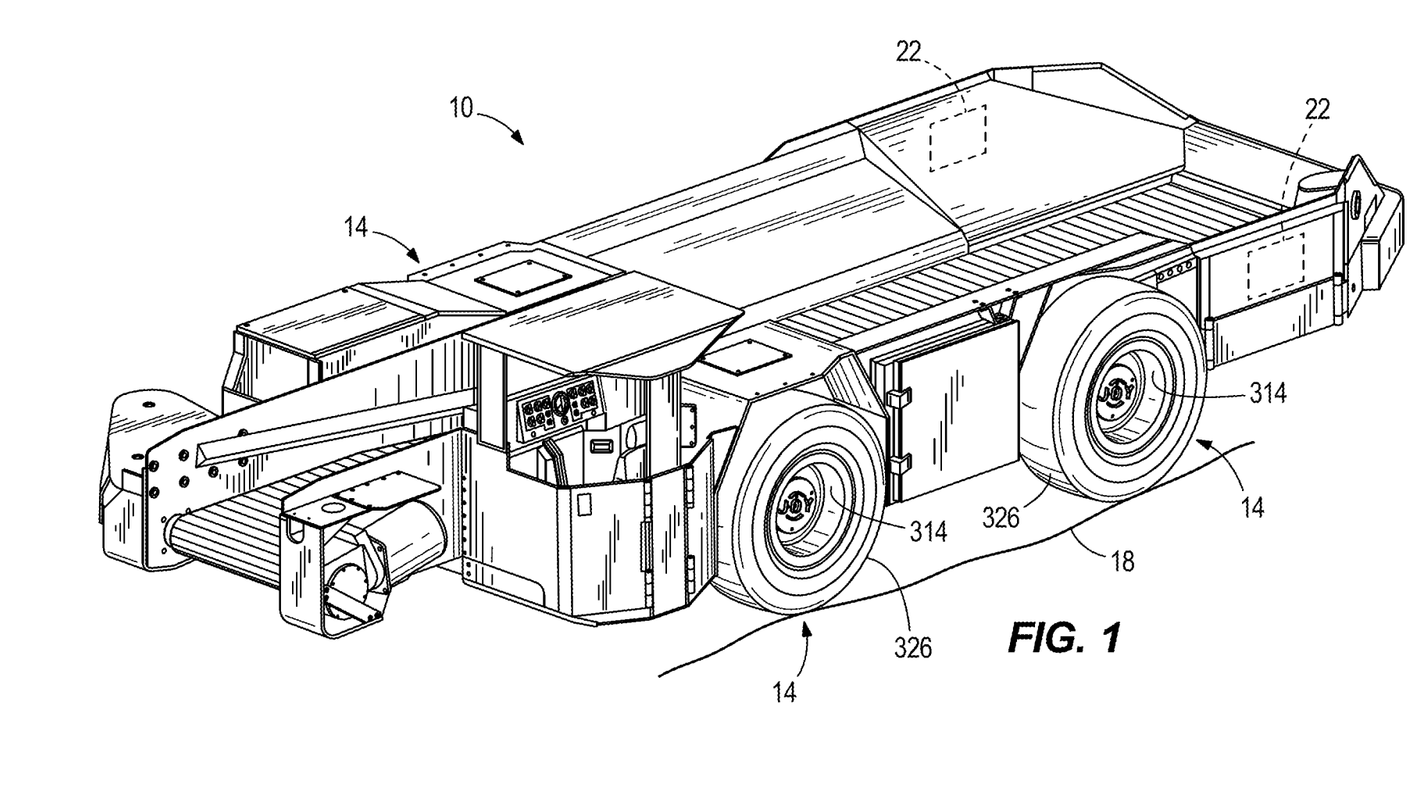
FIG. 1 is a perspective view of a haulage vehicle including wheel units according to an embodiment of the disclosure.

FIG. 1 illustrates a vehicle 10 including a plurality of wheel units 14 that support and move the vehicle 10 relative to a surface 18. In the illustrated embodiment, the vehicle 10 is a haulage vehicle (e.g., a shuttle car) that receives material (e.g., soil, dirt, rock, etc.) during a mining operation; however, in other embodiments, the vehicle 10 can be a different type of vehicle related or unrelated to a mining operation (e.g., a construction vehicle, an agricultural vehicle, a forestry vehicle, etc.). The illustrated vehicle 10 includes one or more prime movers (e.g., electric motors 22) drivably coupled to four wheel units 14 (only two wheel units 14 are shown in FIG. 1). In particular, each electric motor 22 is coupled to a pair of wheel units 14 located on respective left or right sides of the vehicle 10. In other embodiments, the vehicle 10 can include one electric motor 22 drivably coupled to all four wheel units 14 or each wheel unit 14 can be driven by one electric motor 22. In further embodiments, the vehicle 10 can include fewer or more than four wheel units 14 and/or the prime movers 22 can be different prime movers (e.g., internal combustion engines, hybrid power sources, etc.). In some embodiments, the prime movers 22 are coupled to the four wheel units 14 through a primary reducer, or through other components.

Figure 2:
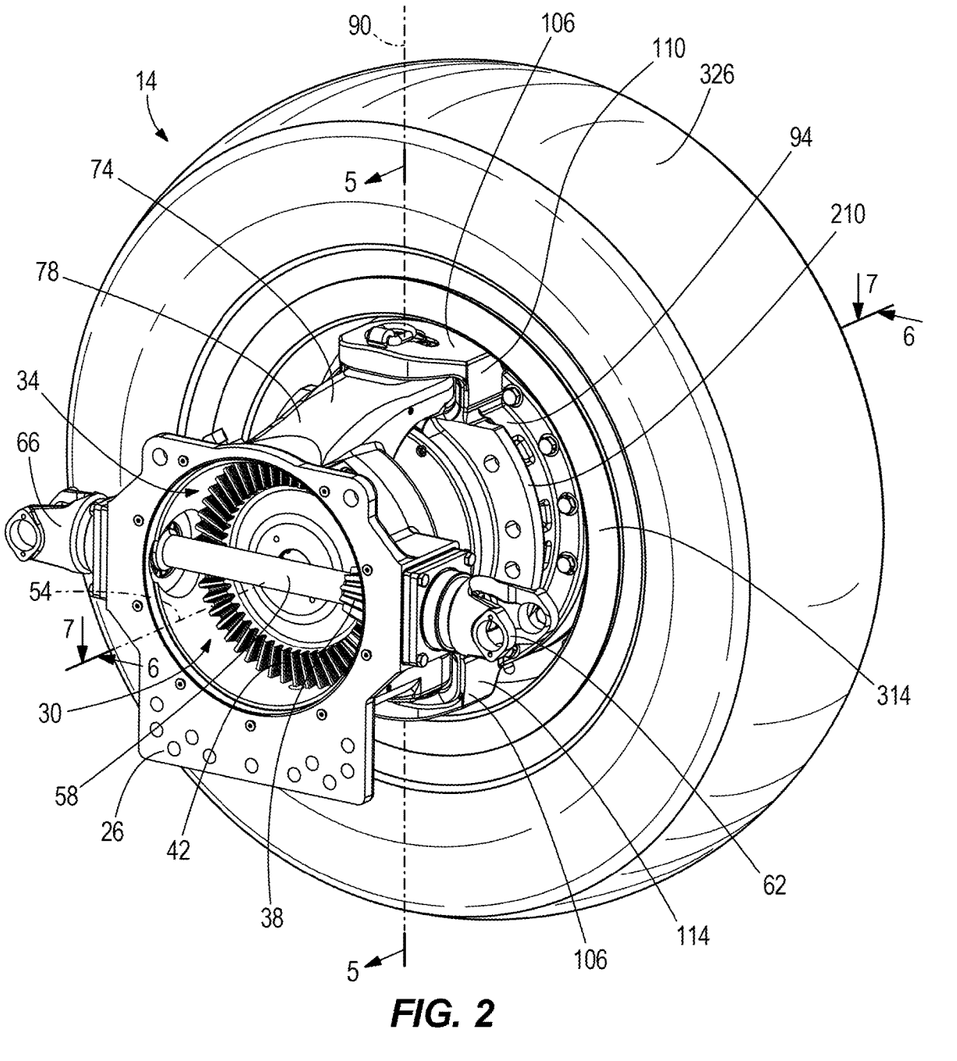
FIG. 2 is a perspective view of a wheel unit of FIG. 1.
Figure 3:
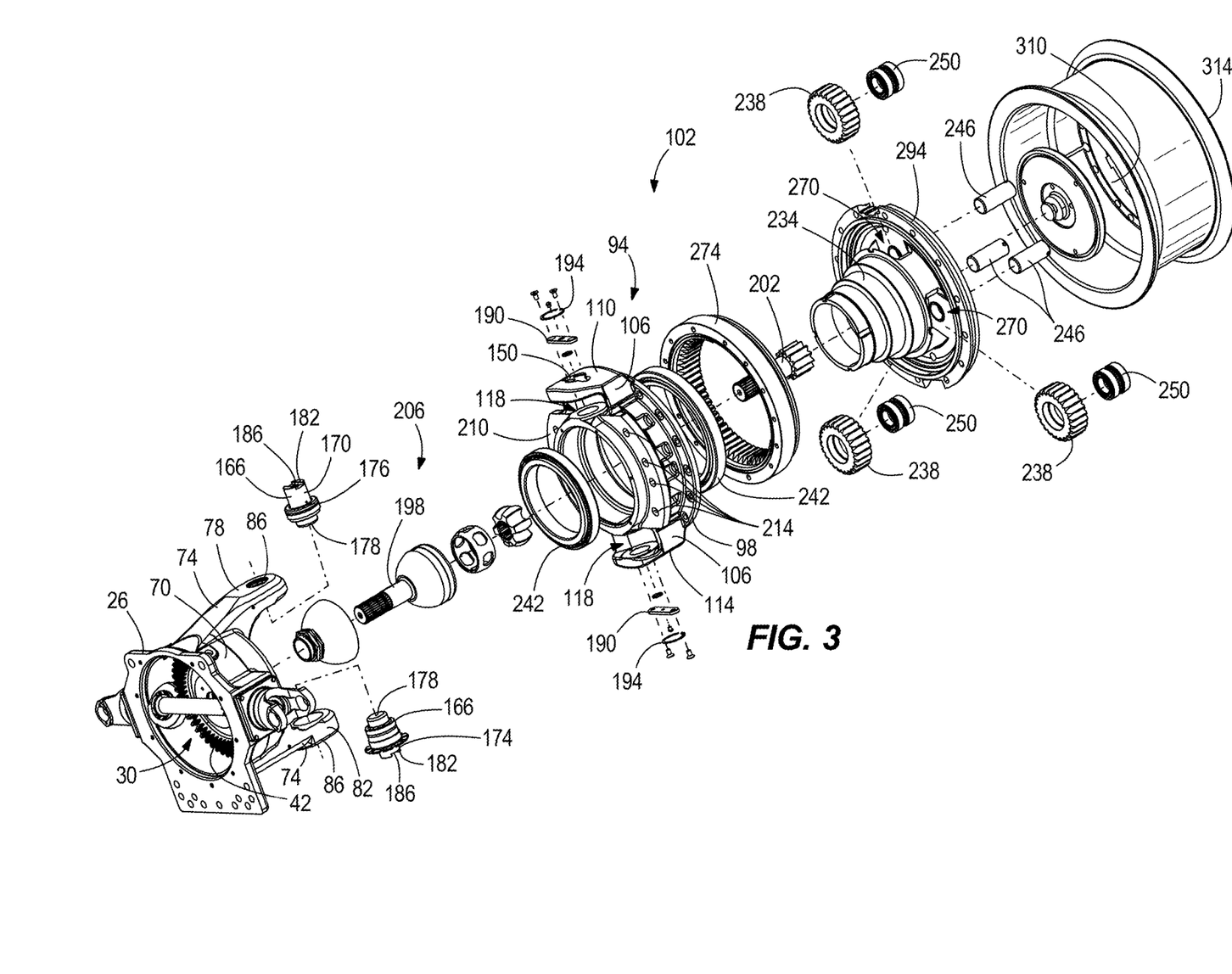
FIG. 3 is a first exploded view of the wheel unit of FIG. 2.
Figure 4:
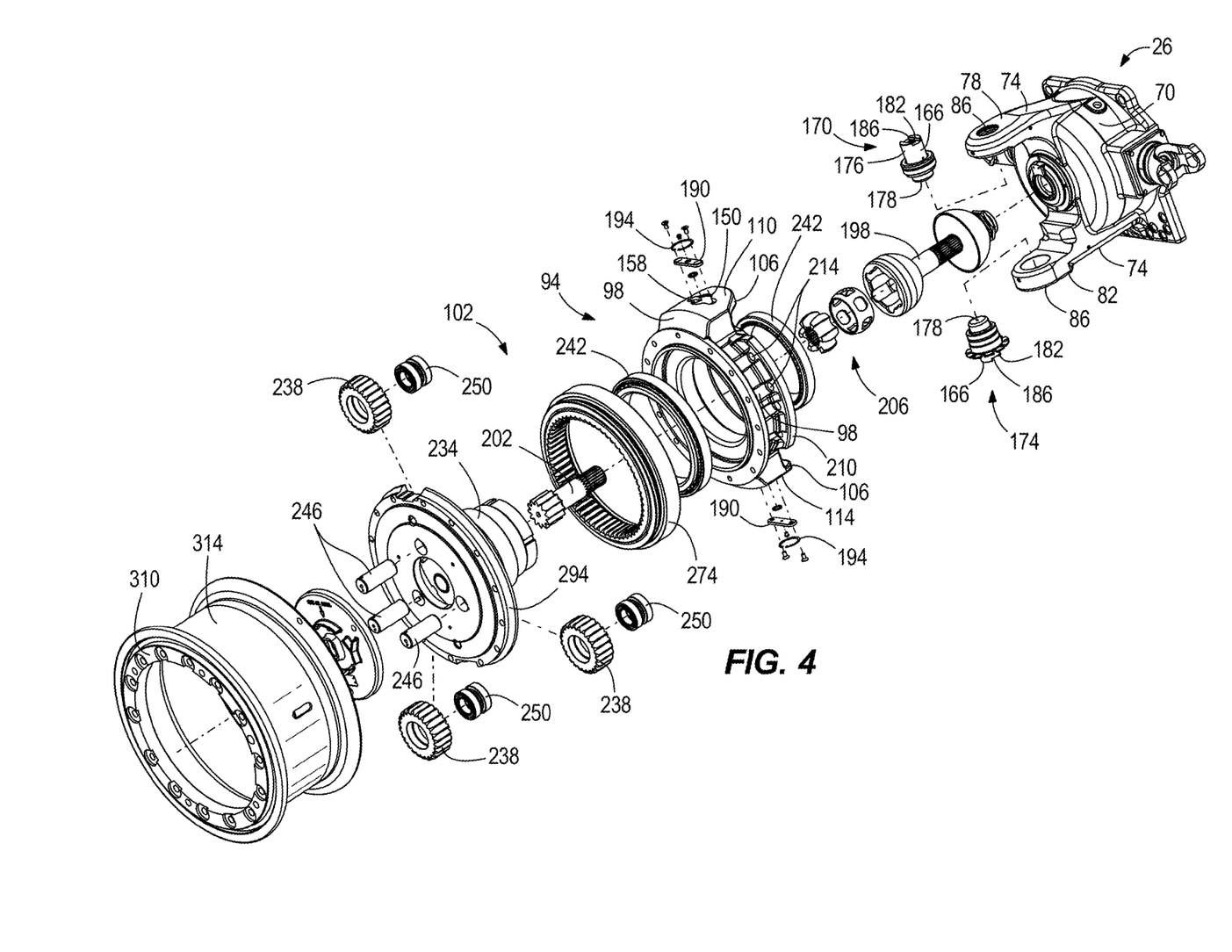
FIG. 4 is a second exploded view of the wheel unit of FIG. 2.
Figure 6:
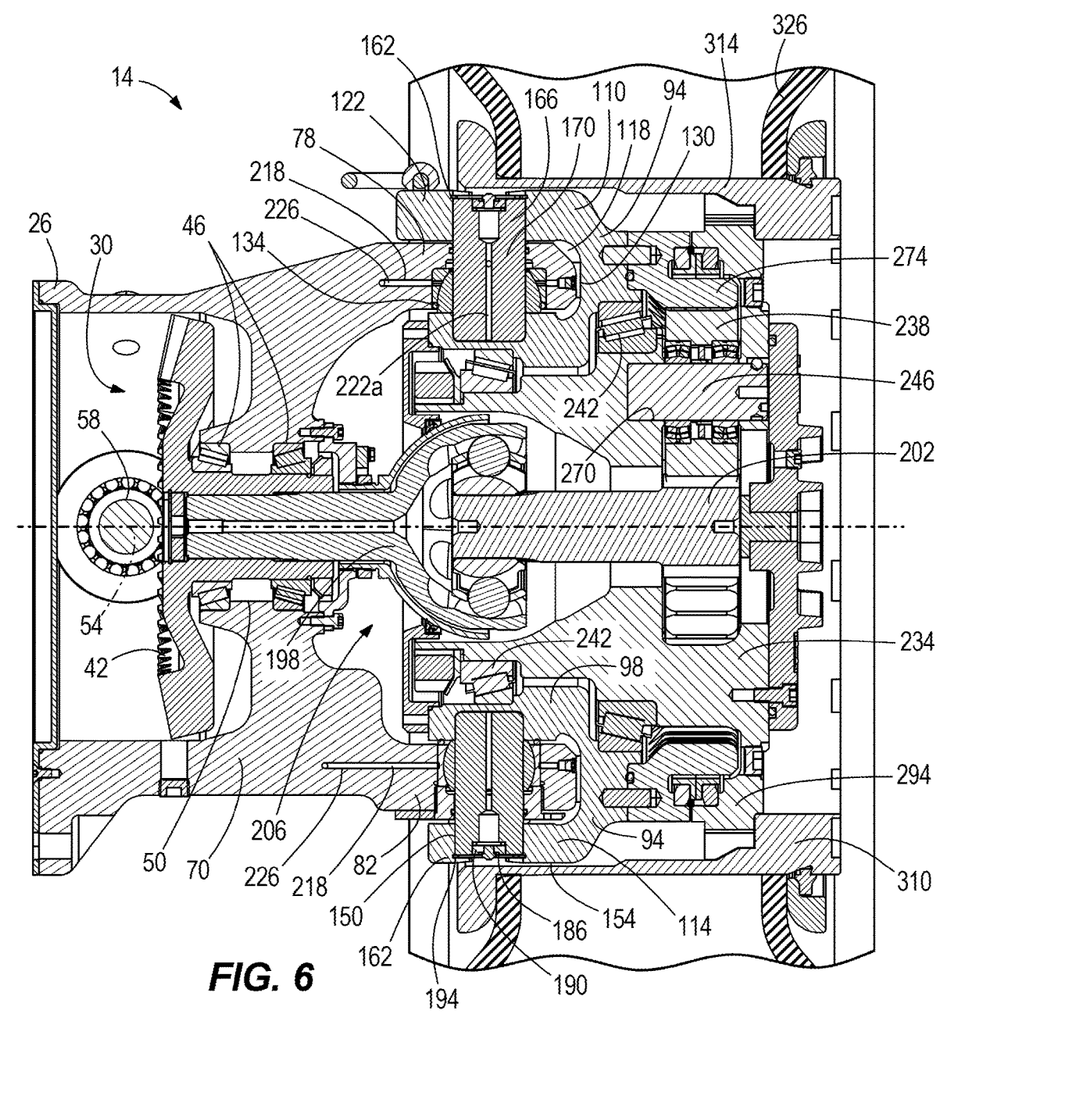
FIG. 6 is a cross sectional view taken along line 6-6 of the wheel unit of FIG. 2 while the wheel unit is steered straight.

Each wheel unit 14 is substantially the same, and as such, one of the wheel units 14 is discussed in detail below and the features of one wheel unit 14 are equally applicable to the other wheel units 14. With reference to FIGS. 2-4, each wheel unit 14 includes a main housing 26 or suspension housing 26 affixed to a chassis of the vehicle 10. In other embodiments, the main housing 26 can be pivotably coupled to the chassis of the vehicle 10 (e.g., allowing movement of the wheel unit 14 in a direction substantially perpendicular to the surface 18). The illustrated main housing 26 includes a cavity 30 that receives a bevel gear assembly 34 having a first bevel gear 38 and a second bevel gear 42. As shown in FIG. 6, two bevel gear bearings 46 rotatably support the second bevel gear 42 within a central aperture 50 of the main housing 26 about a rotational axis 54 (FIG. 2).

With continued reference to FIGS. 2-4, the first bevel gear 38 is enmeshed with the second bevel gear 42 and is driven by a driveshaft 58. The driveshaft 58 is coupled to a first yoke 62 extending from a first side of the main housing 26 and a second yoke 66 extending from a second opposing side of the main housing 26. In the illustrated embodiment, the driveshaft 58 is perpendicular to the rotational axis 54. The first and second yokes 62, 66 are coupled to either the electric motor 22 or another wheel unit 14. For example, in one configuration, the first yoke 62 is drivingly coupled to an output of the electric motor 22 and the second yoke 66 is drivingly coupled to a corresponding first yoke 62 on a second, adjacent wheel unit 14. In other words, the electric motor 22 drives the bevel gear assembly 34 of one wheel unit 14 by one of the first and second yokes 62, 66, and the other yoke 62, 66 drives another wheel unit 14. A linkage (e.g., a driveshaft) is coupled between the yokes 62, 66 of adjacent wheel units 14 for one wheel unit 14 to drive the other wheel unit 14.

As shown best in FIGS. 3 and 4, the main housing 26 includes a main body 70 and a pair of control arms 74 extending from the main body 70. The pair of control arms 74 extend parallel to the rotational axis 54 and include an upper arm 78 and a lower arm 82 positioned on opposite sides of the main body 70, across the rotational axis 54. Each arm 78, 82 includes a control arm aperture 86 extending therethrough. In the illustrated embodiment, the control arm apertures 86 are concentric to define a kingpin or steering axis 90 (FIGS. 2 and 5), which is perpendicular to the rotational axis 54.

Figure 5:
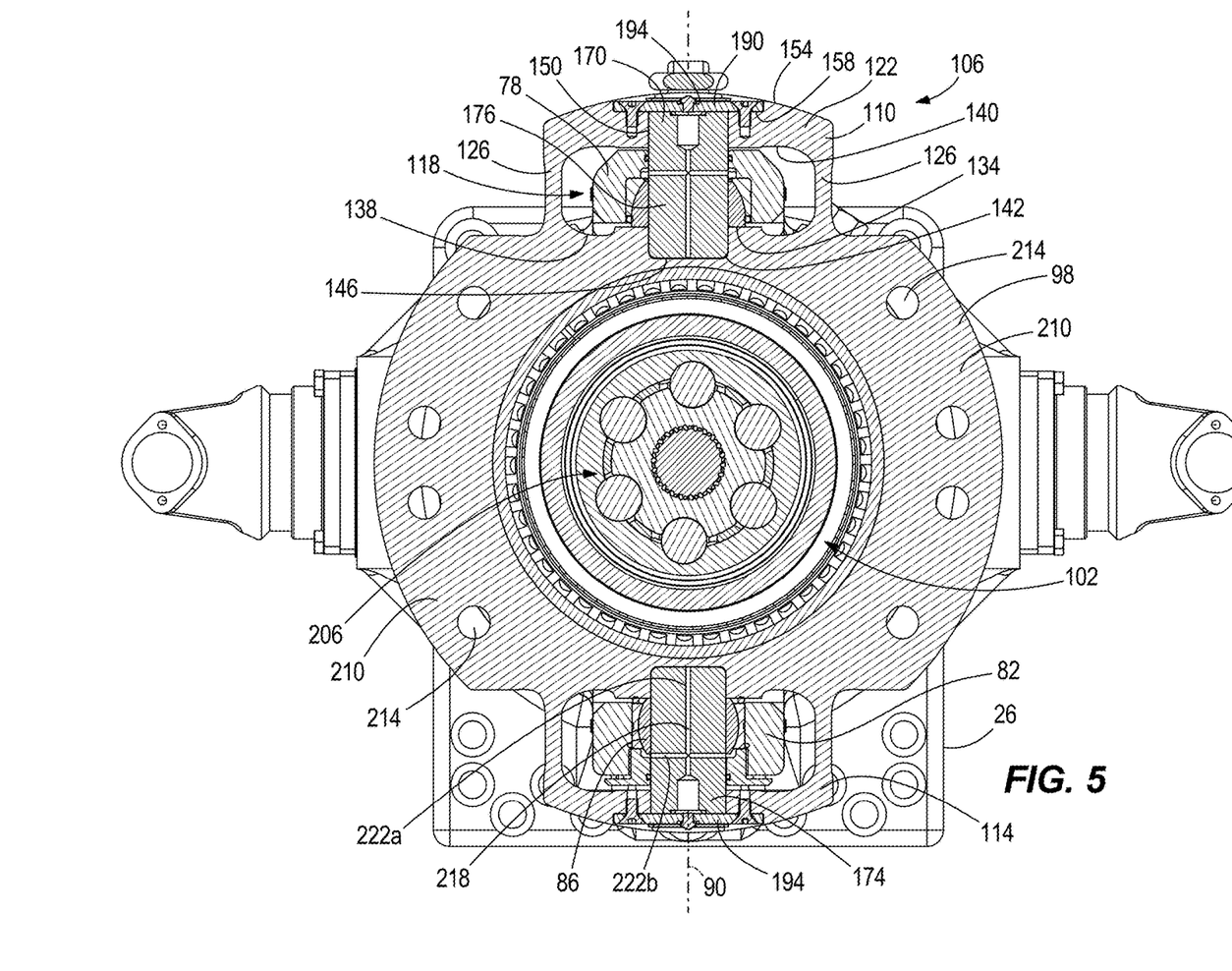
FIG. 5 is a cross sectional view taken along line 5-5 of the wheel unit of FIG. 2.

With reference to FIGS. 3 and 4, a transmission housing 94 (i.e., a pivot housing) is pivotably coupled to the main housing 26 about the steering axis 90 (FIGS. 2 and 5). The transmission housing 94 includes a generally ring-shaped main body 98 coupled to a portion of a transmission 102 and a pair of protrusions 106 (e.g., pivot hubs) extending radially from the main body 98 relative to the rotational axis 54 (FIG. 2). The pair of protrusions 106 includes an upper protrusion 110 (e.g., an upper hub) and a lower protrusion 114 (e.g., a lower hub) positioned on opposite sides of the main body 98. Each of the protrusions 110, 114 cooperate with the main body 98 to define a receiving cavity 118, which receives one of the control arms 74 of the main housing 26. In the illustrated embodiment, the receiving cavity 118 of the upper protrusion 110 receives the upper control arm 78 and the receiving cavity 118 of the lower protrusion 114 receives the lower control arm 82. As shown in FIG. 6, the protrusions 110, 114 and the main body 98 are formed to provide bifurcated receiving areas to receive the upper arm 78 and the lower arm 82.

With reference to FIGS. 5 and 6, the upper and lower protrusions 110, 114 are substantially the same, and as such, the upper protrusion 110 is discussed in detail below and the features of the upper protrusion 110 are equally applicable to the lower protrusion 114. The upper protrusion 110 includes an outer arm 122, a pair of sidewalls 126, and a rear wall 130, and the main body 98 of the transmission housing 94 includes a flat surface 134 (e.g., a peripheral surface) positioned between the sidewalls 126. The outer arm 122, the sidewalls 126, the rear wall 130, and the flat surface 134 cooperate to define the receiving cavity 118 of the upper protrusion 110. In particular, the flat surface 134 forms a radially inward surface 138 of the receiving cavity 118, and the outer arm 122 forms a radially outward surface 140 of the receiving cavity 118. The outer arm 122 is positioned radially above the flat surface 134 relative to the rotational axis 54 and extends generally parallel thereto. The radially inward surface 138 includes a recess (e.g., a receiving aperture 142) extending into the main body 98, away from the outer arm 122. The receiving aperture 142 includes a bottom surface 146 positioned within the main body 98. In other embodiments, the receiving aperture 142 can be a through aperture. The outer arm 122 includes a protrusion aperture 150 extending through the outer arm 122 to be in communication with the receiving cavity 118 of the upper protrusion 110. The receiving aperture 142 and the protrusion aperture 150 are concentric. The outer arm 122 further includes an outer surface 154 with a slot 158 extending across the protrusion aperture 150 and a groove 162 circumscribing the protrusion aperture 150.

With reference to FIGS. 3-5, the main body 98 also includes flanges 210 which are coupled to a steering linkage (not shown) to control pivoting movement of the transmission housing 94 relative to the main housing 26. In the illustrated embodiment, the flanges 210 are positioned on sides of the main body 98 between the pair of protrusions 106 and include a plurality of apertures 214, which may receive fasteners to couple the steering linkage to the main body 98. In other embodiments, one of the flanges 210 can be coupled to the steering linkage.

With reference to FIGS. 3-6, the wheel unit 14 further includes a pair of pins 166 (i.e., kingpins) that pivotably couple the main body 98 to the main housing 26 about the steering axis 90. The pair of pins 166 defines the steering axis 90 and includes an upper pin 170 and a lower pin 174. The pins 170, 174 are substantially the same, and as such, the upper pin 170 is discussed in detail below and the features of the upper pin 170 are equally applicable to the lower pin 174. The illustrated upper pin 170 includes a cylindrical body 176 with an inner end portion 178 and an outer end portion 182. The upper pin 170 also includes a cross slot 186 recessed into the outer end 182. To couple the upper pin 170 between the main body 98 and the main housing 26, the upper pin 170 is inserted through the protrusion aperture 150 of the upper protrusion 110, through the control arm aperture 86 of the upper control arm 78, and into the receiving aperture 142 associated with the upper protrusion 110. The inner end 178 of the upper pin 170 is received by the receiving aperture 142 such that the inner end 178 abuts the bottom surface 146 of the receiving aperture 142. In addition, the outer end 182 of the upper pin 170 is recessed with respect to the outer surface 154 of the outer arm 122 such that the cross slot 186 aligns with the slot 158. A cross bar 190 is received by the cross slot 186 and the recessed slot 158 and is fixed to the upper protrusion 110 (e.g., by bolts or other fastening means) to inhibit rotation of the upper pin 170 relative to the main body 98 about the steering axis 90. In addition, the cross bar 190 inhibits radial outwards movement of the upper pin 170 relative to the rotational axis 54, along the steering axis 90. A snap ring 194 is received within the groove 162 of the protrusion aperture 150 to also fix the cross bar 190 to the main body 98. In other embodiments, the cross bar 190 can be omitted and the snap ring 194 inhibits radial movement of the upper pin 170.

With continued reference to FIGS. 3-6, the lower pin 174 is coupled between the main body 98 and the main housing 26 in a similar manner. For example, the lower pin 174 is inserted through the protrusion aperture 150 of the lower protrusion 114, through the control arm aperture 86 of the lower control arm 82, and into the receiving aperture 142 associated with the lower protrusion 114. Another cross bar 190 is received by the cross slot 186 of the lower pin 174 and is fixed relative to the main body 98.

With continued reference to FIGS. 5 and 6, the wheel unit 14 further includes a plurality of lubrication lines 218 disposed at the interface between the main housing 26 and the pins 166. The lubrication of the connection between the upper arm 78 and upper pin 170 is substantially the same as the lubrication of the connection between the lower arm 82 and lower pin 174, therefore only the lubrication of the upper connection is described. The plurality of lubrication lines 218 includes pin lubrication lines 222 extending through the upper pin 170. In the illustrated embodiment, the pin lubrication lines 222 include an axial line 222a, extending longitudinally along the steering axis 90 through the pin body 176 (FIG. 5) from an opening located in the cross slot 186 to the other end of the upper pin 170. The pin lubrication lines 222 also include a transverse line 222b that is in communication with the axial line 222a and extends perpendicular to the steering axis 90. The plurality of lubrication lines 218 also includes arm lubrication lines 226, which may extend through the upper arm 78 generally parallel to the rotational axis 54. The plurality of lubrication lines 218 may include an inlet nipple (not shown) to fill the lines with lubricant. In some embodiments, the lubrication lines 218 may be connected to a lubrication system which may supply lubricant during operation. The plurality of lubrication lines 218 supply lubricant to the connection between the upper pin 170 and the upper arm 78 to allow for easy rotation and reduced wear of the upper pin 170 about the steering axis 90.

With continued reference to FIGS. 3-6, the transmission 102 is supported by the main housing 26 and the transmission housing 94. The transmission 102 includes an input drive shaft 198 and a sun gear 202 that are coupled together for co-rotation by a constant velocity joint (i.e., CVJ) 206. The illustrated input drive shaft 198 is coupled to the second bevel gear 42 by a spline engagement for co-rotation therewith. Likewise, the sun gear 202 is coupled to the CVJ 206 by a spline engagement. The CVJ 206 is positioned within a planet cage 234 of the transmission housing 94. The CVJ 206 enables the input drive shaft 198 to drive the sun gear 202 about the rotational axis 54 as the sun gear 202 (and ultimately the transmission housing 94) pivots about the steering axis 90.

With continued reference to FIGS. 3-6, the illustrated planet cage 234 is rotatably coupled to the main body 98 about the rotational axis 54 by first and second roller bearings 242. The planet cage 234 also receives the sun gear 202 therein and rotatably supports a plurality of planet gears 238. In particular, each planet gear 238 is rotatably supported on the planet cage 234 by a pin 246. In the illustrated embodiment, each pin 246 is fixed to the planet cage 234 and at least one roller bearing 250 is positioned between each pin 246 and its associated planet gear 238. In other embodiments, the planet gears 238 can be fixed to their associated pin 246 with the pin 246 rotatably coupled to the planet cage 234 by at least one roller bearing 250. In addition, a portion of the planet gears 238 extends from openings 270 formed in the planet cage 234 to enmesh with a ring gear 274. The ring gear 274 is fixed (e.g., via fasteners) to the main body 98. In other embodiments, the transmission 102 can be configured differently (e.g., the transmission 102 can be a multi-stage planetary transmission).

With continued reference to FIGS. 3-7, the planet cage 234 includes a flange 294 radially extending beyond the ring gear 274 relative to the rotational axis 54. The illustrated flange 294 is selectively fixed to an attachment ring 310 of a wheel rim 314 to fix the wheel rim 314 to the planet cage 234.

With reference back to FIG. 2, a tire 326 is coupled to the wheel rim 314 for co-rotation with the wheel rim 314 to engage the surface 18 providing traction to the vehicle 10. In other embodiments, the tire 326 can be a continuous track coupled to wheel rims 314 of multiple wheel units 14 that engages the surface 18.

Figure 7:
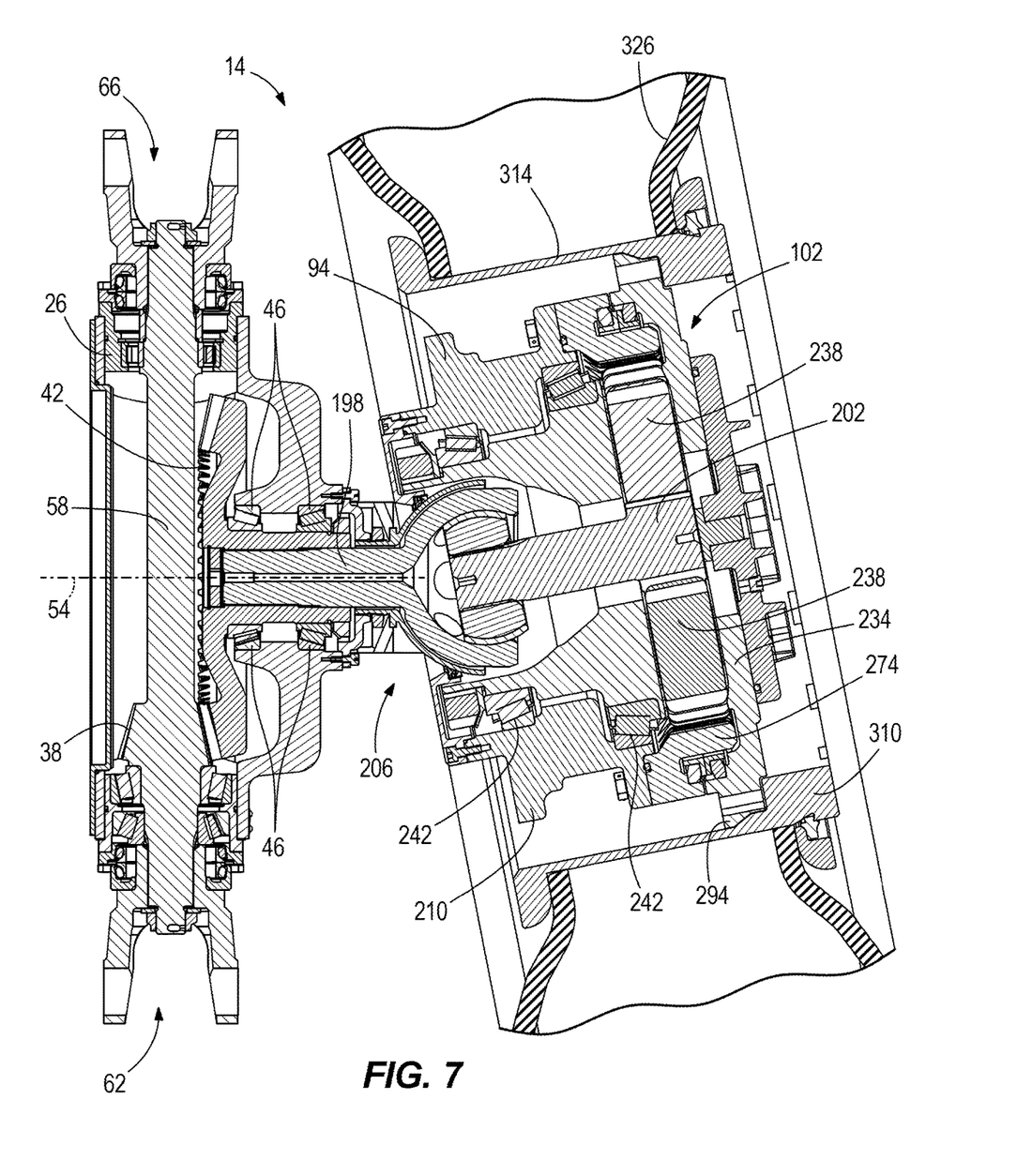
FIG. 7 is a cross sectional view taken along line 7-7 of the wheel unit of FIG. 2 while the wheel unit is pivoted to turn the haulage vehicle.

During operation of one wheel unit 14, which is equally applicable to the other wheel units 14, the electric motor 22 drives the bevel gear assembly 34 that drives the transmission 102, which in turn drives the tire 326 providing movement of the vehicle 10. In particular, the bevel gear assembly 34 drives CVJ 206 which drives the sun gear 202 about the rotational axis 54 and the sun gear 202 drives the planet gears 238 about their respective axis. As the ring gear 274 is fixed to the main body 98, engagement between the planet gears 238 and the ring gear 274 causes the planet cage 234 to rotate about the rotational axis 54 (e.g., the planet gears 238 move about the rotational axis 54 as the bevel gear assembly 34 drives the transmission 102). In turn, the planet cage 234 drives the wheel rim 314 (and ultimately the tire 326) about the rotational axis 54. When the vehicle 10 is desired to be steered straight, as shown in FIG. 6, the input drive shaft 198 is substantially coaxial with the sun gear 202. With reference to FIG. 7, when the vehicle 10 is desired to be steered left or right, the transmission housing 94 is pivoted about the steering axis 90 such that all components outboard of the CVJ 206 are also pivoted in the same direction about the steering axis 90. Specifically, the steering linkage connected to the flanges 210 can apply a force to the main body 98, causing the transmission housing 94 to pivot about the steering axis 90 with respect to the main housing 26 and therefore the vehicle 10. As the transmission housing 94 pivots about the steering axis 90, the CVJ 206 continues to drive the transmission 102 to ultimately rotate the tire 326 about the rotational axis 54.

The bifurcated coupling between the main housing 26 and the transmission housing 94 creates enhanced engagement between the kingpins 166, the control arms 74, and the transmission housing 94, which increases the operating life of the wheel unit 14 compared to conventional non-bifurcated coupling designs. For example, the transmission housing 94 defining the bifurcated receiving cavities 118 allows the pins 166 to be supported by the protrusion apertures 150 and the receiving apertures 142, on either side of the respective control arm aperture 86. Thus, each pin 166 is subjected to a double shear condition (compared to a single shear condition of conventional designs) to more evenly distribute steering loads across the pins 166. Additionally, the pair of protrusions 106 and the slots 158 allow the pins 166 to be fixed to the transmission housing 94 without need of a heavy interference or press fit.

Although the disclosure has been described in detail with reference to certain preferred embodiments, variations and modifications exist within the scope and spirit of one or more independent aspects of the disclosure as described.

Various features and advantages of the disclosure are set forth in the following claims.

The invention claimed is:

1. A wheel unit for a vehicle, the wheel unit comprising:
a main housing configured to be coupled to a chassis of the vehicle, the main housing including first and second control arms;
a transmission housing including a body having first and second protrusions extending from the body, the first protrusion partially defining a first cavity that receives a portion of the first control arm, the second protrusion partially defining a second cavity that receives a portion of the second control arm;
a first pin coupled between the first protrusion of the transmission housing and the first control arm of the main housing;
a second pin coupled between the second protrusion of the transmission housing and the second control arm of the main housing, the first and second pins defining a steering axis, the transmission housing pivotably coupled to the main housing about the steering axis;
a transmission at least partially received within the transmission housing; and
a wheel rim rotatably coupled relative to the transmission housing about a rotational axis, the wheel rim drivable about the rotational axis by the transmission.

2. The wheel unit of claim 1, wherein the first protrusion of the transmission housing includes a first arm positioned outwardly relative to the first control arm of the main housing in a direction along the steering axis, and wherein the first arm includes a first aperture that partially receives the first pin.

3. The wheel unit of claim 2, wherein the first control arm includes a first control arm aperture aligned with the first aperture of the first protrusion, wherein the first control arm aperture at least partially receives the first pin, wherein the body of the transmission housing includes an aperture aligned with the first aperture of the first protrusion and the first control arm aperture of the main housing, and wherein the first pin is partially received within the aperture of the body.

4. The wheel unit of claim 1, wherein the first pin includes a first end portion and a second end portion, wherein the first end portion is received within an aperture of the body, and wherein the second end portion is received within an aperture of the first protrusion.

5. The wheel unit of claim 4, wherein the first protrusion includes a slot in communication with the aperture of the first protrusion, wherein the slot receives a cross bar coupled to the first protrusion, and wherein the cross bar inhibits movement of the first pin in an outward direction along the steering axis.

6. The wheel unit of claim 5, wherein the first protrusion further includes a groove circumscribing the aperture of the first protrusion, and wherein the groove receives a snap ring that retains the cross bar relative to the first protrusion.

7. The wheel unit of claim 1, wherein the first protrusion includes an outer arm, a pair of side walls, and a rear wall, wherein the body of the transmission housing includes a surface positioned radially inward relative to the outer arm, and wherein the outer arm, the pair of side walls, the rear wall, and the surface cooperate to form the first cavity that opens toward the main housing to receive the first control arm.

8. A wheel unit for a vehicle, the wheel unit comprising:
a main housing configured to be coupled to a chassis of the vehicle, the main housing including a control arm having a control arm aperture;
a transmission housing including a body having a protrusion extending from the body, the protrusion partially defining a receiving cavity that receives a portion of the control arm, the protrusion including a protrusion aperture;
a pin insertable through the protrusion aperture of the transmission housing to be at least partially received within the control arm aperture of the main housing, the pin defining a steering axis, the transmission housing pivotably coupled to the main housing about the steering axis; and
a transmission at least partially received within the body of the transmission housing, the transmission configured to drive a wheel rim that is rotatably coupled relative to the transmission housing about a rotational axis.

9. The wheel unit of claim 8, wherein the protrusion includes an outer arm and the body includes a surface positioned radially inward relative to the outer arm, and wherein the outer arm and the surface at least partially define the receiving cavity.

10. The wheel unit of claim 9, wherein the control arm is received within the receiving cavity between the outer arm and the surface of the body.

11. The wheel unit of claim 9, wherein the surface of the body includes a receiving aperture, and wherein the pin includes a first end portion received in the receiving aperture.

12. The wheel unit of claim 8, wherein the protrusion includes an outer arm, a pair of sidewalls connecting the outer arm to the body, and a rear wall connecting the outer arm to the body, and wherein the outer arm, the pair of sidewalls, and the rear wall cooperate with the body to define the receiving cavity, and wherein the receiving cavity opens toward the main housing to receive the control arm.

13. The wheel unit of claim 12, wherein the outer arm includes the protrusion aperture and a first slot extending transverse to the protrusion aperture, wherein the pin includes a second end portion including a second slot, and wherein the second slot is aligned with the first slot when the pin is inserted through the protrusion aperture.

14. The wheel unit of claim 13, wherein a cross bar is received within the first and second slots, and wherein the cross bar prevents rotation of the pin relative to the transmission housing about the steering axis, and prevents movement of the pin in an outward direction along the steering axis.

15. A wheel unit for a vehicle, the wheel unit comprising:
a transmission housing including a body having a protrusion extending from the body, the protrusion including a first aperture, the body including a second aperture, the protrusion defining a recess cavity configured to receive a control arm having a control arm aperture, the control arm configured to be coupled to a chassis of the vehicle;
a transmission at least partially received within the body of the transmission housing, the transmission configured to drive a wheel rim that is rotatably coupled relative to the transmission housing about a rotational axis; and
a pin insertable through the first aperture of the protrusion to be at least partially received within the second aperture of the body, the pin defining a steering axis, the transmission housing configured to selectively move the wheel rim about the steering axis.

16. The wheel unit of claim 15, wherein the pin is also insertable through the control arm aperture to couple the transmission housing to the control arm such that the transmission housing is rotatable about the steering axis with respect to the control arm.

17. The wheel unit of claim 15, wherein the protrusion includes an outer arm spaced from the body, wherein the outer arm includes the first aperture, wherein the body includes a surface positioned radially inward relative to the outer arm, and wherein the surface includes the second aperture.

18. The wheel unit of claim 17, wherein the outer arm includes a groove that receives a snap ring to prevent removal of the pin along the steering axis.

19. The wheel unit of claim 15, wherein when the pin is inserted through the first aperture, an outer end portion of the pin is recessed from an outer surface of the protrusion.

* * * * *